(12) United States Patent
Bellace

(10) Patent No.: US 8,746,448 B1
(45) Date of Patent: Jun. 10, 2014

(54) ELECTRONIC DEVICE CASE WITH FINGER RETAINING LOOP

(71) Applicant: Charles A. Bellace, Thorofare, NJ (US)

(72) Inventor: Charles A. Bellace, Thorofare, NJ (US)

( * ) Notice: Subject to any disclaimer, the term of this patent is extended or adjusted under 35 U.S.C. 154(b) by 34 days.

(21) Appl. No.: 13/745,900

(22) Filed: Jan. 21, 2013

(51) Int. Cl.
*B65D 85/00* (2006.01)

(52) U.S. Cl.
USPC ............ 206/320; 224/217; 220/752; 220/754

(58) Field of Classification Search
USPC .................. 206/320; 224/217, 218, 930, 673; 220/752, 754
See application file for complete search history.

(56) References Cited

U.S. PATENT DOCUMENTS

| | | | | |
|---|---|---|---|---|
| 3,938,166 | A * | 2/1976 | Sloop | ............................ 396/423 |
| 5,383,091 | A | 1/1995 | Snell | |
| 8,428,664 | B1 * | 4/2013 | Wyers | ........................ 455/575.1 |
| 2003/0213886 | A1 | 11/2003 | Gilbert | |
| 2009/0283559 | A1 * | 11/2009 | Foggiato | ........................ 224/217 |
| 2010/0222118 | A1 | 9/2010 | Interdanato | |
| 2011/0266313 | A1 | 11/2011 | Ghalib | |
| 2011/0266316 | A1 | 11/2011 | Ghalib | |
| 2012/0048873 | A1 | 3/2012 | Hyseni | |
| 2012/0063066 | A1 * | 3/2012 | Floit | ........................ 361/679.01 |

* cited by examiner

*Primary Examiner* — Anthony Stashick
*Assistant Examiner* — Blaine Neway
(74) *Attorney, Agent, or Firm* — Daniel Boudwin; Global Intellectual Property Agency LLC

(57) ABSTRACT

Disclosed is a case for an electronic device that includes a retaining loop. The loop includes a first end, a second end, and a fastener. A recess on the interior of the case is adapted to house the fastener when the retaining loop is engaged therewith, while a pair of openings positioned over the recess allows the retaining loop to pass through. The loop is positioned so that a user can place a finger inside the loop, which in turn provides a secure grip on the case and electronic device. The fastener sits flush within the recess on the interior of the case, and can be used to detach the loop for replacement thereof as desired. The fastener and recess are positioned between the case and the phone, and includes a low profile design that prevents bulging in the case.

2 Claims, 4 Drawing Sheets

ELECTRONIC DEVICE CASE WITH FINGER RETAINING LOOP

BACKGROUND OF THE INVENTION

1. Field of the Invention

The present invention relates to an electronic device. More particularly, it pertains to a case for an electronic device having a detachable finger retaining loop.

The use of portable electronic devices has become ubiquitous in modern society. People carry and use a variety of devices, including cellular phones, smartphones, portable music players, and electronic tablets on a daily basis. As can be appreciated, these devices often cost a considerable amount of money, and are difficult to repair. When damage does occur, most devices will need to be replaced, as the manufacturing process that is utilized makes most devices difficult to work with. In addition, a majority of phones are purchased with a subsidy through a cellular phone provider, which reduces the price thereof in exchange for a two-year service contract. Because of this, it is important to keep the device in a useful condition for the duration of the contract period.

One of the most useful means of protecting electronic devices is with a case that surrounds the device and provides protection against falls. It is common for a people to drop their electronic devices at least once or twice during use. While many devices are built in a manner that will survive an occasional drop, devices made of glass or aluminum are susceptible to breakage from a single fall. Even if a device is never dropped, it is more likely to scratch when not kept in a case, which causes the device to be less valuable if a user attempts to sell it. Contact with rough surfaces and keys may cause permanent marks and damage, thereby ruining the aesthetics of the device. In addition to aesthetic scratches, contact with abrasive items can cause functional damage that can render the device unusable. As an example, many smartphones contain a camera with a flush lens. If the lens is scratched, it can degrade the image quality of the photographs taken to the point that post processing is unable to correct the issues. A final reason that many people use a case is for resale value. Electronic devices can often be sold for a high percentage of their resale value; particularly, unlocked smartphones that can be used on various carrier networks. As can be appreciated, devices that are kept in a scratch-free and damage-free condition will be more valuable than devices that have been damaged and scratched.

While many people opt to cover their electronic devices with a case, most of these cases are constructed of low friction materials, which are designed to assist a user with retrieving the device from a pocket, and placing it back therein. While this may be beneficial for storage, the slippery material can make the phone inside a case more susceptible to falling, particularly as it is removed from a pocket. The present invention overcomes the problems inherent in conventional electronic cases with a device that prevents falls from occurring. The device comprises a case that includes a detachable retaining loop on the back wall thereof. The loop is positioned so that a user can place a finger therethrough, which in turn provides a secure grip on the case and electronic device. The loop further includes a fastener that is positioned within a recess on the interior of the case. The recess allows the fastener to sit flush within the interior of the case, and enables a user to detach the loop for replacement thereof as desired. The fastener and recess are positioned between the case and the electronic device, and includes a low profile design that prevents bulging in the case.

2. Description of the Prior Art

Devices have been disclosed in the prior art that relate to cases for electronic devices. These include devices that have been patented and published in patent application publications. These devices generally relate to cases for electronic devices having a retaining loop. The forgoing is a list of devices deemed most relevant to the present disclosure, which are herein described for the purposes of highlighting and differentiating the unique aspects of the present invention, and further highlighting the drawbacks existing in the prior art.

Specifically, Ghalib, U.S. Patent Application Publication No. 2011/0266313 discloses a handheld electronic case, comprising a loop and a mounting structure. The loop is configured to receive at least one finger of a user, and the mounting structure is configured to attach the loop to the handheld electronic device case. The mounting structure is also configured to orient the loop so that a central axis of an opening of the loop is generally transverse to a longitudinal direction of the handheld electronic device. In some embodiments, rivets, mechanical fasteners, latches, hooks, friction fitting slots, clips, or other adherents may also be used to attach the mounting structure with the handheld electronic device. The Ghalib device, while disclosing a case with a loop, does not disclose a fastener positioned within a recess on the interior of the case, thereby allowing the fastener to sit flush with the interior of the case.

Similar to Ghalib, Hyseni, U.S. Patent Application Publication No. 2012/0048873, discloses a gripper for gripping a portable electronic device case. The gripper comprises a retainer to partially pass through the case opening, and a retractable strap having two flanged ends. Each strap flanged end is passed through the retainer slots to communicate with the case inside. The strap flange is shaped to prevent the strap from completely passing through the retainer slots to the case outside when the strap is pulled. The gripper facilitates carrying a portable electronic device using a single finger, or an open hand, depending on the size of the device. The Hyseni device does not disclose a finger retaining loop that is detachably removable from the case. The present invention utilizes a buckle for attachment of the loop, which enables a user to remove the loop if desired. The device enables the user to replace the loop with one of varying color, thereby changing the aesthetic appearance of the case and loop.

In addition to the '313 application, Ghalib, U.S. Patent Application Publication No. 2011/0266316, discloses a handheld electronic device grip that includes a mounting structure and a strap with first and second surfaces configured to engage each other and form a loop. The loop is configured to receive at least one finger of a user, while the mounting structure is configured to attach the loop to a handheld electronic device case. The mounting structure can be configured to orient the loop so that the central axis opening of the loop is generally transverse to the longitudinal direction of the handheld electronic device or the handheld electronic device case. The '316 device does not, however, utilize a pair of apertures through which a buckle is placed, or include a recess on the interior of the case that enables the fastener to sit flush with the interior of the case.

Interdanato, U.S. Patent Application Publication No. 2010/0222118, discloses an apparatus having a loop device fastened to a communication unit that permits a user to securely hold the unit using one or more fingers inserted through a loop device for efficient and stable operation of a keyboard, touch screen, trackball or the like using the user's thumb. The Interdanato device is not part of a case, but instead provides a loop that can be attached directly to an electronic device. The present invention provides a case with a detachable loop. The case can be placed over a variety of electronic devices, and prevents the need for an adhesive to make contact with the electronic device.

Gilbert, U.S. Patent Application Publication No. 2003/0213886, discloses a collapsible support made up of a rigid mobile part and of a flexible band that are attached together and to the remainder of the peripheral structure of the object by three articulations. The support may be formed as an integral one-piece, one shot injection molding of a plastics material. The Gilbert device provides an attachment for the rear portion of an electronic device that can be used as a retaining loop and as a support. The device is not configured as part of a case for placement over an electronic device, but is instead intended for direct attachment thereto. The present invention is integrated into an electronic device case, which allows it to be easily attached and removed therefrom.

Finally, Snell, U.S. Pat. No. 5,383,091, discloses a handheld electronic telecommunications device that is provided with a grip and protective casing made of elastomeric material for covering the back face and side walls of the device. The Snell device is provided with finger recesses on the exterior surface to permit the operator to reliably hold and even operate the device with one hand. This device does not disclose a case with a detachable loop, but is instead integrated directly into the electronic device.

The devices disclosed in the prior art provide gripping apparatuses for attachment to electronic devices. These devices are generally attached to an electronic device case, or directly to the electronic device itself. The devices known and disclosed in the prior art, however, do not utilize a detachable retaining loop that includes a fastener positioned within a recess on the interior of the case. The recess in the present invention enables the fastener to sit flush with the interior of the case, and allows a user to detach the loop for replacement thereof as desired.

In light of the prior art and the disclosed elements of the present invention, it is submitted that the present invention substantially diverges in design elements from the prior art. Consequently, it is clear that the present invention is not described by the art and that a need exists for an electronic device case having a built-in finger retaining loop. In this regard, the instant invention substantially fulfills these needs.

SUMMARY OF THE INVENTION

In view of the foregoing disadvantages inherent in the known types of electronic device cases now present in the prior art, the present invention provides a new electronic device case wherein the same can be utilized for providing convenience for the user when gripping an electronic device and case with the hand.

It is therefore an object of the present invention to provide a new and improved electronic device case that has all of the advantages of the prior art and none of the disadvantages.

It is another object of the present invention to provide a new and improved electronic device case that includes a built-in finger retaining loop.

Another object of the present invention is to provide a new and improved electronic device case with a finger retaining loop that is positioned so that a user can place a finger therethrough, which in turn provides a secure grip on the case and electronic device.

Yet another object of the present invention is to provide a new and improved electronic device case that includes a fastener positioned within a recess on the interior of the case that allows the fastener to sit flush with the interior of the case.

Another object of the present invention is to provide a new and improved electronic device case that allows a user to detach the loop for replacement thereof as desired.

A final object of the present invention is to provide a new and improved electronic device case wherein the fastener and recess utilize a low profile design that prevents bulging in the case.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
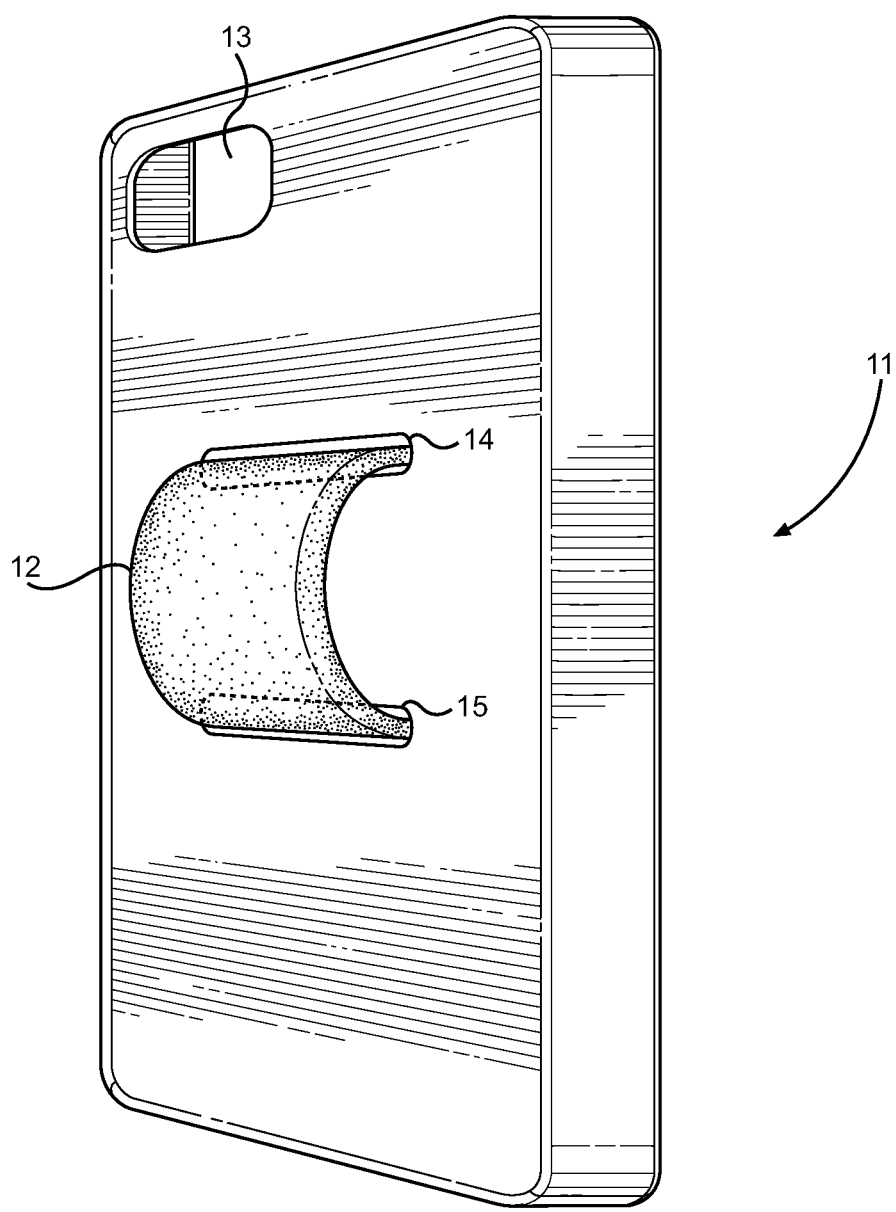
FIG. 1 shows a perspective view of the present invention with the retaining loop on the back wall of the case.

Reference is made herein to the attached drawings. Like reference numerals are used throughout the drawings to depict like or similar elements of the electronic device case. For the purposes of presenting a brief and clear description of the present invention, the preferred embodiment will be discussed as used for providing a retaining loop for an electronic device. The figures are intended for representative purposes only and should not be considered to be limiting in any respect.

Referring now to FIG. 1, there is shown a view of the present invention, which is comprised of a case 11 and a retaining loop 12. The case 11 is designed to be placed over a variety of electronic devices, such as cellular phones, smartphones, portable music players, cameras, gaming devices, personal digital assistances, electronic book readers, and electronic tablets. The case 11 is preferably designed to fit the contours of the electronic device, which ensures a secure connection therebetween. In the preferred embodiment, the case 11 covers over the back side, sidewalls, and a portion of the front side of the electronic device, thereby exposing the user interface, which can comprise a touchscreen, keyboard, pointing device, buttons, or other system. This allows the case 11 to be secured over a device, while still allowing for operation thereof. The case 11 can further include one or more apertures to allow for functionality of the electronic device stored therein. By way of example, the case 11 can include an aperture 13 that enables use of a built-in camera lens and flash on a conventional smartphone. The aperture 13 is preferably reinforced around the edges, which prevents the material from being damaged.

The case 11 further includes a means of securing a retaining loop 12 thereto. In the preferred embodiment, the retaining loop 12 is secured to the case 11 through a first and second retaining loop aperture 14, 15. The retaining loop apertures 14, 15 are positioned on the back wall of the case 11, and are spaced apart a suitable distance to enable the retaining loop 12 to pass therethrough and create a semi-circle opening. In the preferred embodiment, the retaining loop apertures 14, 15 are spaced apart to allow at least one finger to be positioned through the opening of the retaining loop 12. The first and second retaining loop apertures 14, 15 are preferably reinforced around the edges to prevent damage thereto. In an alternate embodiment, the present invention can include three or more retaining loop apertures for creating multiple retaining loops that can allow for more than one finger to be positioned between the case and retaining loop.

The retaining loop apertures 14, 15 can be positioned in any desired location on the back wall of the case 11, preferably, near the midline. This enables a user to place the second or third finger through the opening in the retaining loop 12, which helps to secure the case 11 to prevent accidental dropping thereof. The retaining loop 12 secures the device around the finger, in a manner similar to a ring. As can be appreciated, this will retain the loop 12 and case 11 on the finger, even if the user opens his or her hand and no longer grasps the case.

Figure 2:
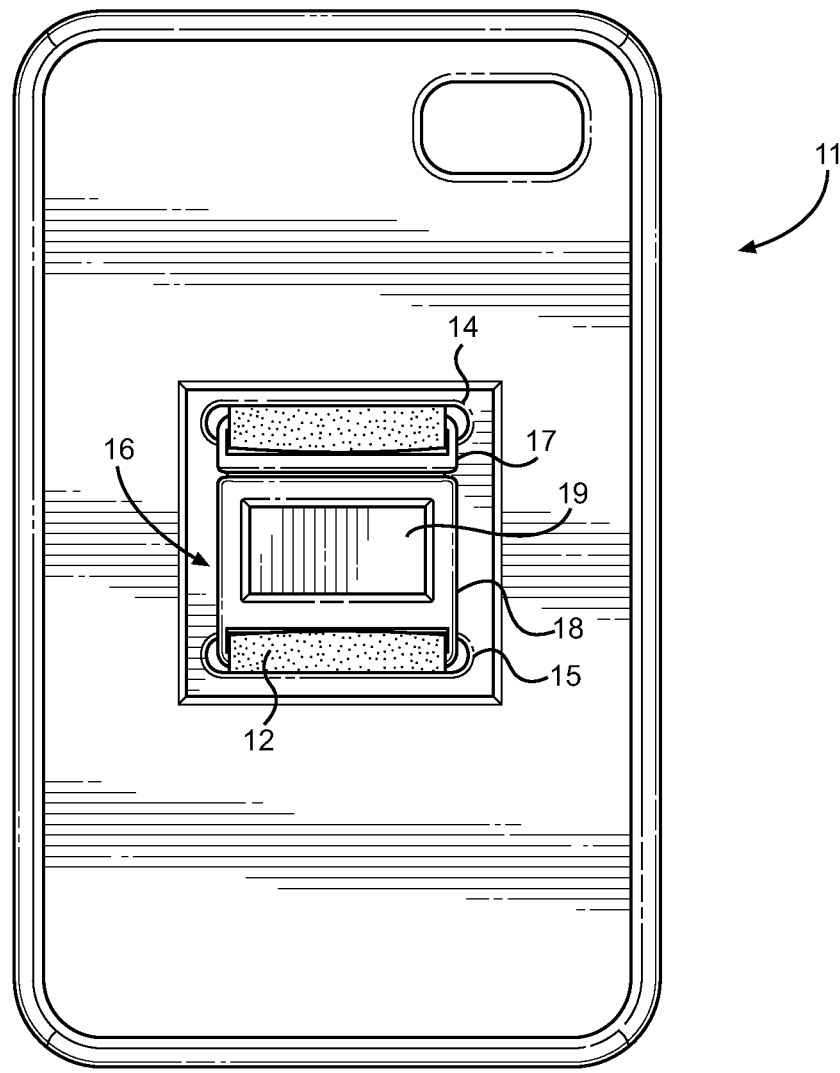
FIG. 2 shows a view of the present invention with the fastener attached and positioned with the recess on the interior of the case.

Referring now to FIG. 2, there is shown a view of the present invention with the fastener attached and positioned with the recess on the interior of the case. The retaining loop 12 is secured to the case 11 with a fastening means. In the preferred embodiment, the fastening means comprises a quick release buckle 16. The buckle 16 is comprised of a male end 17 and a female end 18, that are held together by a catch 19. A first end of the loop 12 is attached to the male end 17, while a second end of the loop 12 is attached to the female end 18. When joined, the loop 12 and buckle 16 create an endless circle.

The buckle 16 is positioned on the interior side of the case 11, which prevents it from being visible on the outer side thereof. The buckle 16 enables the retaining loop 12 to be removably attached to the case 11. This allows a user to detach the loop 12 and buckle 16 for independent use of the case 11. Alternately, the retaining loop 12 can be replaced with loops of varying size, color, design, or indicia. This creates an interchangeable system whereby a user can attach and detach various retaining loops based on the aesthetics thereof.

To install the retaining loop 12, a user can unfasten the buckle 16 and feed the first end through the first retaining loop aperture 14 so that the catch 19 is facing out from the interior of the case 11. The user can then feed the second end of the buckle 16 through the second retaining loop aperture 15. To fasten the buckle 16, the user can continue to pull the male and female ends 17, 18 so that a sufficient amount of slack exists to allow the buckle 16 to be closed. The user can then pull the slack out so that the retaining loop 12 has an opening for at least one finger.

Figure 3:
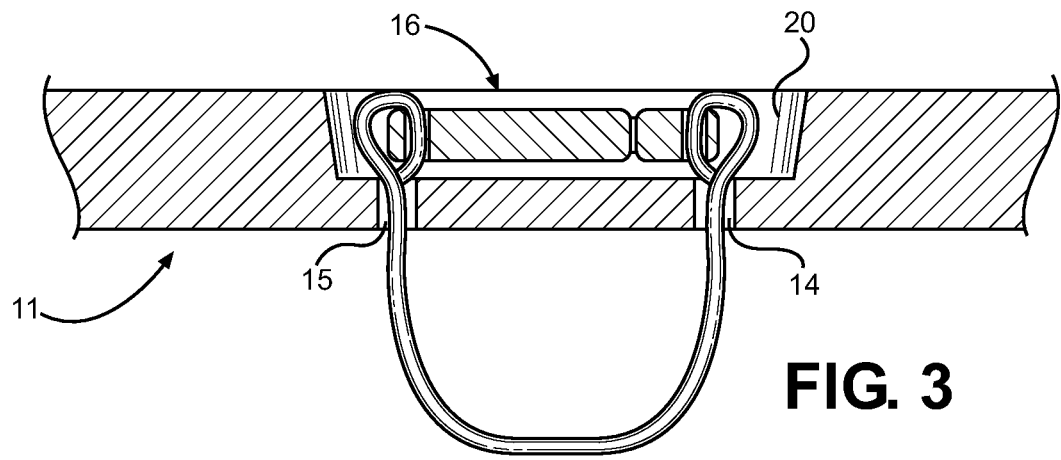
FIG. 3 shows a cross-sectional view of the present invention with the fastener attached and positioned with the recess on the interior of the case.

Referring now to FIG. 3, there is shown a cross-sectional view of the present invention with the fastener attached and positioned with the recess 20 on the interior of the case 11. The buckle 16 is positioned on the interior of the case 11 within a recess 20. The recess 20 is formed in the back wall of the case 11. This enables the buckle 16 to remain flush when installed within the case 11, thereby preventing the buckle 16 from creating a bulge on the outer side thereof. Additionally, the recess 20 prevents the buckle 16 from making contact with the electronic device when installed within the case 11. As can be appreciated, if the buckle 16 is allowed to make contact with the electronic device, it can cause scratches or damage thereto.

The length and width of the recess 20 are preferably larger than the buckle 16, which provides a sufficient amount of space for the buckle 16 to rest therein. The depth of the recess 20 is at least the same width as the buckle 16, which ensures that it remains flush with the interior of the case 11. The recess 20 is positioned over top of the retaining loop apertures 14, 15, which provides a means of passing the retaining loop 12 therethrough.

Figure 4:
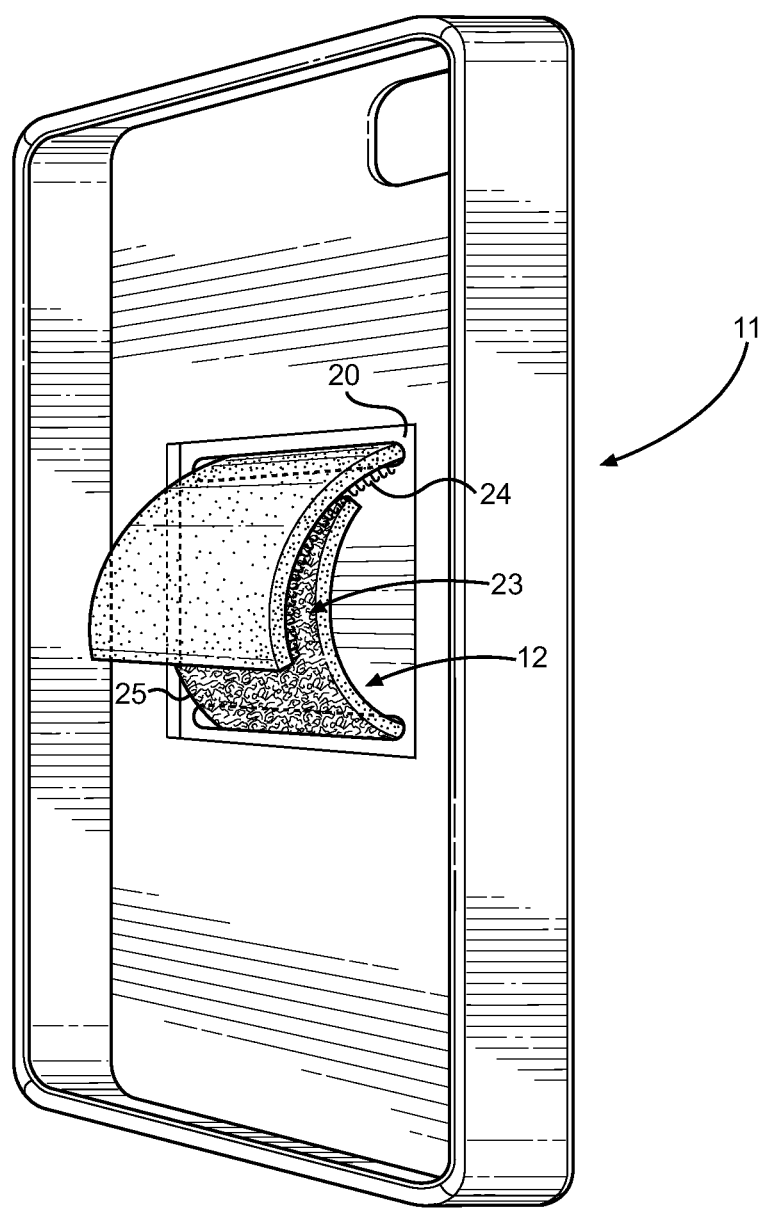
FIG. 4 shows a perspective view of an alternate embodiment of the present invention, wherein the retaining loop fastening means utilizes a hook and loop fastener.

Referring now to FIG. 4, there is shown a perspective view of an alternate embodiment of the present invention, wherein the retaining loop 12 fastening means utilizes a hook and loop fastener. In an alternate embodiment, the retaining loop 12 can attach to the case 11 with a hook and loop fastener 23. A first end of the loop 12 can contain hook material 24, while a second end of the loop 12 can contain loop 25 material. This enables a user to customize the size of the retaining loop 12 by changing the circumference thereof. As can be appreciated, a user can create a smaller circumference for the retaining loop 12 by overlapping more of the hook 24 and loop 25 material. Alternately, the user can increase the circumference of the retaining loop 12 by lessening the overlap of the hook 24 and loop 25 material. Once the hook 24 and loop 25 material are secured together, it is positioned within the recess 20 on the interior of the case 11. In addition to hook 24 and loop 25 material, a variety of fastening means can be utilized. Buttons, side release buckles, magnets, clips, tab and slots, and continuous loops that are permanently attached are also contemplated.

The loop can be constructed from a variety of materials. In one embodiment, the loop is made of an elastic material, and can have a diameter that is less than the diameter of a finger. When a finger is inserted through the opening, the diameter of the loop expands to accept the finger. This ensures a secure attachment between the loop and the finger, which prevents the loop from being inadvertently removed from the finger. Alternately, the loop can be constructed of rubber, silicone, plastic, nylon, cotton, or fabric. The loop can further be constructed of a material and in a manner that enables it to collapse onto the case when not in use. The collapsed loop rests substantially flat on top of the back wall of the case, which allows the case and loop to lie flat on a surface. The loop may additionally be constructed of a material that enables it to maintain its annular configuration when not in use. This enables a user to quickly insert his or her finger therethrough.

Figure 5:
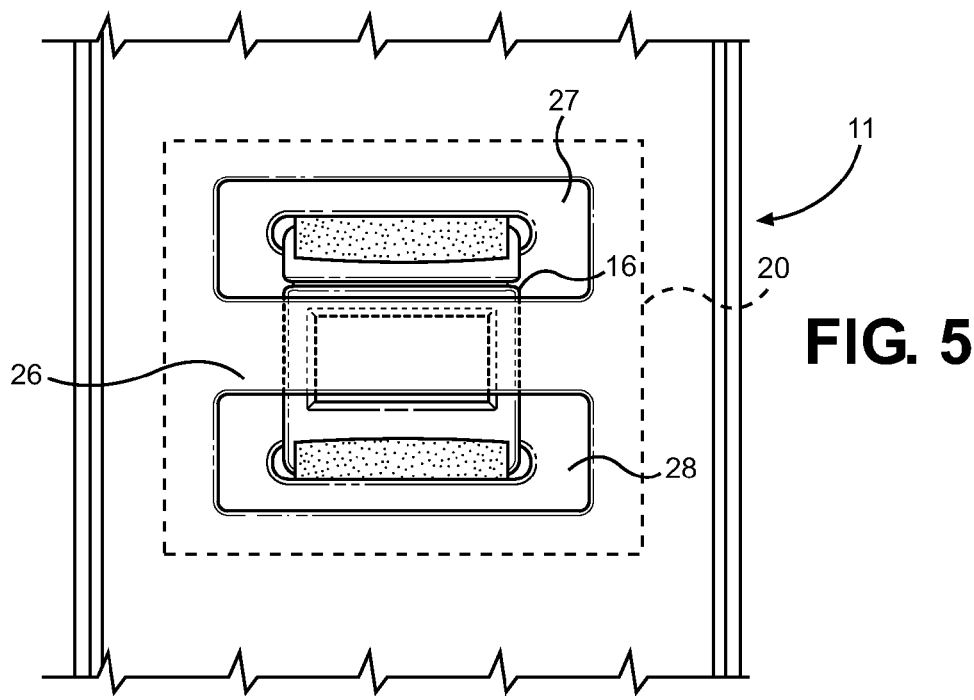
FIG. 5 shows a close-up perspective view of an alternate embodiment of the present invention, wherein the recess includes a support bridge.

Referring now to FIG. 5, there is shown a close-up perspective view of an alternate embodiment of the present invention, wherein the recess includes a support bridge. The recess 20 on the interior of the case 11 can include a support bridge 26 that spans the width thereof, and provides a means of securing the buckle 16 in position. In this embodiment, an upper 27 and lower 28 aperture are formed with a section of case material therebetween forming a support bridge 26. The support bridge 26 is positioned in the middle of the recess 20, and secures the buckle 16 therein. This prevents the buckle 16 from shifting about when in the recess 20, and prevents the buckle 16 from making contact with the device contained within the case 11.

Figure 6:
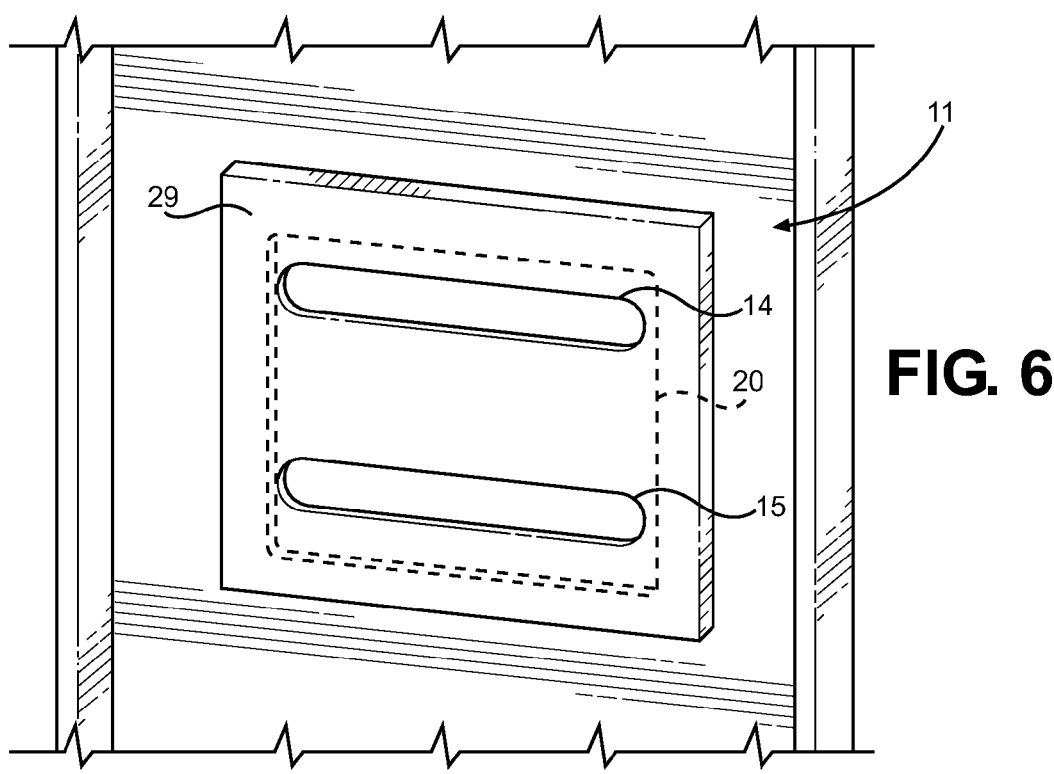
FIG. 6 shows a close-up perspective view of an alternate embodiment of the present invention, wherein the back side of the case includes a back plate affixed over the first and second retaining loop apertures.

The support bridge 26 requires the addition of a reinforcement on the back side of the case 11 since the interior of the case 11 is thinner at the recess 20. As shown in FIG. 6, the reinforcement comprises back plate 29, which is a section of case material that is affixed over the first and second retaining loop apertures 14, 15 on the back side of the case 11. The back plate 29 provides additional support to the case 11 and buckle, which prevents the case 11 from flexing when it is supported by one or more fingers inside the loop.

As can be appreciated, electronic device cases are generally constructed from two basic material types: silicone and plastic. Silicone is an inert, polymer that is formed of silicon together with carbon, hydrogen, oxygen, and sometimes other elements. This provides a rubber-like material that is ideal for use as an electronic device case due to its flexibility and impact resistance. While the flexibility enables the case to be easily installed and removed, it can stretch and flex in areas where an insufficient amount of material is present. Adding back plate 29 over top of the recess 20 provides a sufficient amount of material to prevent excessive flexing thereof. Alternatively, if the case 11 is constructed of a plastic material, the existing material surrounding the recess 20 provides a sufficient amount of material to prevent flexing, thereby making the reinforcement 29 unnecessary.

To install the retaining loop between the back plate 29 and support bridge, a user can feed the first end of the loop through the first retaining loop aperture 14, and the second end through the second retaining loop aperture 15. The ends of the retaining loop will pass through the back plate 29 to the interior of the case. The user can then separate the support bridge from the back plate 29, and slide one of the ends of the retaining loop therethrough, so that the loop is positioned between the support bridge and back plate 29. The user can then fasten the buckle, and position it in the recess 20 between the support bridge and back plate 29.

Overall, the present invention provides a means of gripping an electronic device. The retaining loop and case provide protection to the fragile components of the device, and enable a user to retain the device in his or her hand in a secure manner. The loop can be secured around one or more fingers, or to a variety of surfaces or locations. Loops having a larger diameter can be used for securing the case to objects that have a larger diameter than a finger. The fastener can be positioned on the exterior of the case and secured around an object for hands free use thereof. The retaining loop can be detached and replaced with loops of varying size, color, and design. The recess allows the fastener to sit flush with the interior of the case, and allows a user to detach the loop for replacement thereof as desired. Alternately, the case can be used without the retaining loop in a conventional manner.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A case for holding a tablet style electronic communications device, comprising:
   a back wall having an interior side and an outer side, and at least three sidewalls;
   a retaining loop having a first end, a second end, and a connection means for attaching said first and second ends together;
   a back plate extending above said back wall of said case, said back plate having a first aperture and a second aperture extending therethrough;
   an upper retaining loop aperture and lower retaining loop aperture extending through said back wall;
   said back plate is attached to said back wall around the perimeter of said back plate so that the interior of said back plate is detached from said case to allow said retaining loop to rest between said back plate and said back wall.

2. The device of claim 1, wherein said first aperture and second aperture of said back plate are aligned with said upper and lower retaining loop apertures, thereby allowing said retaining loop to pass therethrough.

\* \* \* \* \*